United States Patent [19]

Tresp

[11] Patent Number: 5,706,401
[45] Date of Patent: Jan. 6, 1998

[54] METHOD FOR EDITING AN INPUT QUANTITY FOR A NEURAL NETWORK

[75] Inventor: Volker Tresp, Munich, Germany

[73] Assignee: Siemens Aktiengesellschaft, Munich, Germany

[21] Appl. No.: 699,558

[22] Filed: Aug. 19, 1996

[30] Foreign Application Priority Data

Aug. 21, 1995 [DE] Germany .................. 195 30 647.3

[51] Int. Cl.$^6$ ............................. G06E 1/00; G06E 3/00; G06F 15/18
[52] U.S. Cl. ............................................ 395/21; 395/23
[58] Field of Search ........................ 395/21, 2.41, 22, 395/23, 24, 11, 932

[56] References Cited

U.S. PATENT DOCUMENTS 5,479,576  12/1995  Watanabe et al. ..................... 395/23

FOREIGN PATENT DOCUMENTS

| 0 504 457 | 9/1992 | European Pat. Off. . |
| PS 266 661 | 4/1989 | Germany . |
| OS 42 41 812 | 6/1994 | Germany . |

OTHER PUBLICATIONS

"Bayesian Back-Propagation," Buntine et al, Complex Systems, vol. 5, (1991), pp. 605–643.

"Supervised Learning From Incomplete Data Via An Em Approach," Ghahramani et al, from Advances In Neural Information Processing Sysems, vol. 6, Cowan et al, Eds. (1994) pp. 120–127.

"Training Neural Networks With deficient Data," Tresp et al, Advances In Neural Information Systems, vol. 6, Cowan, Eds. (1994) pp. 128–135.

Marko et al. "Neural Network Application to Comprehensive Engine Diagnostics" Systems, Man, and Cybernetics, 1992 Int'l Conf., pp. 1016–1022, Aug. 1992.

*Primary Examiner*—Tariq R. Hafiz
*Assistant Examiner*—Jason W. Rhodes
*Attorney, Agent, or Firm*—Hill, Steadman & Simpson

[57] ABSTRACT

In a method for supplementing missing data in a time series used as an input to a neural network or for improving noise-infested data supplied to a neural network, error distribution densities for the missing values are calculated on the basis of the known measured values from the time series and their known or predetermined error distribution density, and samples are taken from this error distribution density according to the Monte Carlo method. These each lead to an estimated or predicted value whose average is introduced for the value to be predicted. The method can be employed for the operation as well as for the training of the neural network, and is suitable for use in all known fields of utilization of neural networks.

13 Claims, 2 Drawing Sheets

TIME SERIES

METHOD FOR EDITING AN INPUT QUANTITY FOR A NEURAL NETWORK

BACKGROUND OF THE INVENTION

1. Field of the Invention

The present invention is directed to a method for the neural modeling of dynamic processes for which, in particular, incomplete or poor series of measurements exist.

2. Description of the Prior Art

Neural networks are being introduced into a large variety of technical fields. Neural networks prove especially suitable wherever it is important to derive decisions from complex technical relationships and from inadequate information. For forming one or more output quantities, one or more input quantities, for example, are supplied to the neural network. To this end, such a network is first trained for the specific application. Neural networks prove especially suitable for many applications since they are universal approximators.

A problem that often arises in conjunction with the use of neural networks, however, is that the input data for the training or during operation of the network are often not complete. This situation, as well as the fact that the measured values which are supplied to the neural network for constructing a time series are often imprecise or noise-infested, can cause degraded training results of the networks.

SUMMARY OF THE INVENTION

An object of the present invention is to provide a method with which the quality of chronologically successively occurring input quantities of a neural network can be improved. In particular, missing or inadequate, or noise-infested data should be supplemented by the inventive method.

The above object is achieved in accordance with the principles of the present invention in a method for editing an input quantity to a neural network including the steps of forming a time series of a set of measured values of a variable input quantity by determining respective values of the input quantity at discrete points in time, the time series being supplied to a neural network, identifying a statistical noise distribution of an uncorrelated noise of finite variance that has a chronological average value of zero and which is superimposed on the measured values, and, for any missing value in the time series, generating a replacement value by calculating a statistical missing value noise distribution dependent on the statistical noise distribution from at least one of the measured values neighboring the missing value in the time series, and calculating the value to replace the missing value using at least two Monte Carlo samples of the missing value obtained according to the missing value noise distribution.

A particular advantage of the inventive method lies in exploiting the fact that the missing or inadequate values or the noise-infested values that are to be supplied to the neural network are a component of a sequence of values in the time series. Advantageously, the known error distribution probability of the remaining values can be utilized in order to be able to calculate an anticipated error distribution, and thus the anticipated value for the missing value, according to the inventive method.

Missing values that neighbor one another in the time series can also be determined according to the inventive method. An iterative procedure is provided for this purpose that first calculates one value and subsequently determines the other neighboring value with the data acquired from the one value. This iteration procedure can also be multiply implemented so that an adequate precision of the values to be determined is assured.

In particular, a neural network that is intended to simulate the time series can also be trained according to the inventive method since the learning step width is thereby advantageously referred to the number of Monte Carlo samples that are taken.

A Gaussian distribution is assumed for the deviations of the predicted values of the time series or is predetermined since this is a distribution that corresponds to the greatest possible extent to values that are close to practice.

Simple numerical methods are utilized in the inventive method in order to be able to determine missing values, or in order to be able to predict a future value in the time series with missing values.

Simple mathematical methods are indicated according to the inventive method in order to be able to correspondingly edit measured values, and thus in order to be able to train the neural network.

Especially advantageously, embodiments of the method are disclosed in order to edit noise-infested measured values, or in order to edit measured values that contain a known and an unknown noise component, in order thus to be able to train the neural network in a simple and efficient way.

DESCRIPTION OF THE PREFERRED EMBODIMENTS

Figure 1:
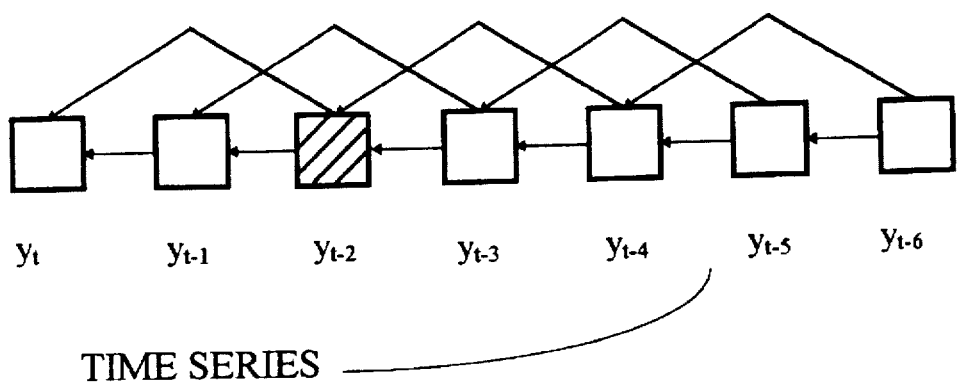
FIG. 1 schematically illustrates a time series for use in explaining the inventive method.

FIG. 1 shows a time series of measured values that, for example, can be supplied to a neural network. In chronological succession, these measured values, are acquired, for example, from a technical system and are referenced as $y_t$ through $y_{t-6}$ according to their chronological succession. The illustrated arrows between the individual boxes symbolize the dependencies of the various values on one another. For example, it is assumed in FIG. 1 that the value $y_{t-2}$ is missing. The relevant values in the Markov blanket, as neighboring values of this missing measured value, are $y_{t-4}$, $y_{t-3}$, $y_{t-1}$ and y. Such a missing measured value in a time series can, for example, arise because the measuring instrument for registering the values did not function at the point in time in question or, in order to train the neural network better, it seems beneficial between individual measured values to supply this neural network with a further value that, consequently, is yet to be identified, i.e. that is still to be generated according to the inventive method.

Figure 2:
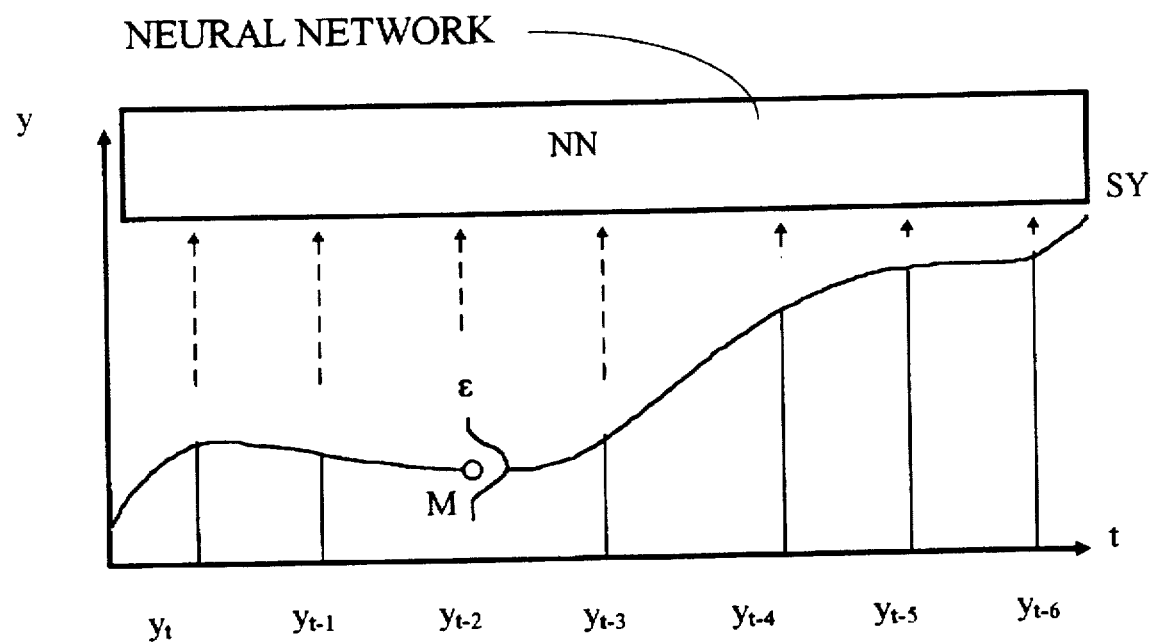
FIG. 2 shows a time series and a system behavior in accordance with the inventive method.

FIG. 2 shows the time series from FIG. 1 in conjunction with a neural network NN. It may be seen that y represents a time-dependent variable that represents the system behavior SY of a technical system. As may be seen, the values $y_t$ through $y_{t-6}$ correspond to measured values that are taken from the system behavior SY. The dashed arrows at the respective points in time symbolize that these measured values are to be supplied to the neural network NN during operation or during training.

As in FIG. 1 as well, the questionable measured value M for the point in time $y_{t-2}$ is not present. The probability density $\epsilon$ is indicated for this measured value M. For example, this probability density $\epsilon$ can be back-calculated according to the inventive method from a predetermined, known error distribution density of the remaining measured values. What is thereby particularly exploited is that the missing measured value must be located between two known measured values and the error thereof is thus also limited by the errors of the neighboring values and the errors of the remaining measured values of the time series. The underlying time series can be described as follows:

$$y_t = f(y_{t-1}, y_{t-2}, \ldots, y_{t-N}) + \epsilon_t \quad (1)$$

wherein the function is either "known to" the neural network such as being stored therein or stored in a memory accessible by the neural network, or is adequately modeled by a neural network. The contribution $\epsilon_t$ denotes an additive, uncorrelated error with the chronological average 0. This error—and this is essential for the inventive method—comprises a known or predetermined probability density $P_\epsilon(\epsilon)$ and typically symbolizes the unmodeled dynamics of the time series. For example, a future value is to be predicted for such a time series that is to be completed according to the inventive method. It should be noted that future values are to be understood as being relative to the time position selected at the moment. This means that for a point in time $y_{t-5}$, the point in time $y_{t-4}$ constitutes its future value. Under these conditions, the conditional probability density can be described as follows for a value of the time series to be predicted:

$$P(y_t|y_{t-1}, y_{t-2}, \ldots, y_{t-N}) = P_\epsilon(y_t - f(y_{t-1}, y_{t-2}, \ldots, y_{t-N})) \quad (2)$$

As already mentioned, the error distribution density must be known. This distribution density can either be calculated on the basis of the system behavior and known, other external quantities,/or can be predetermined. A typical error distribution that occurs in practice is the Gaussian distribution. The conditional probability density can be described as follows with such an assumed Gaussian error distribution:

$$P(y_t|y_{t-1}, y_{t-2}, \ldots, y_{t-N}) = G(y_t; f(y_{t-1}, \ldots, y_{t-N}), \sigma^2) \quad (3)$$

wherein $G(x; c, \sigma^2)$ is the notation for a normal density that is determined at x and with a center C and a variance $\sigma^2$. When it is assumed that the system to be described is presented in the form of a sequence of values on a time axis, then the individual values of $y_t$ can also be interpreted as random variables in a probabilistic network. The invention is thereby based on the problem of predicting a value of the time series with the existing information from the remaining values being employed as completely as possible. Based on the assumptions that were made above, the entire probability density of the time series can be described as follows:

$$P(y_1, y_2, \ldots, y_t) = P(y_1, \ldots, y_N) \prod_{l=N+1}^{t} P(y_l|y_{l-1}, \ldots, y_{l-N}) \quad (4)$$

It is thereby assumed that $y_{t-k}$, with $k \leq N$, is the missing value. Assuming that $y^u = \{y_{t-k}\}$ and $y^m = \{y_{t-1}, \ldots, y_{t-k-N}\}\setminus\{y_{t-k}\}$ are valid, the anticipated value that is to be predicted in the time series can be described as follows:

$$E(y_t|M_{t-1}) = \int f(y_{t-1}, \ldots, y_{t-k}, \ldots, y_{t-N}) P(y^u|y^m) dy^u \quad (5)$$

The following conditions thereby apply: $M_{t-1}$ stands for all measurements up to point in time t-1. The above equation is the basic equation for the prediction with missing data. It should be particularly noted that the unknown $y_{t-k}$ is dependent not only on the values of the time series before the point in time t-k but also is dependent on the measurements following t-k. The reason for this is that the variables in $y^m \cup y_t$ form a minimum Markov blanket of $y_{t-k}$. This minimum Markov blanket is composed of the direct predecessors and the direct successors of a variable and of all direct predecessors of variables of the direct successor. In the example under consideration in FIG. 2, the direct successors are $y_t, \ldots, y_{t-k+1}$. The direct predecessors are:

$$y_{t-k-1} \ldots y_{t-k-N}$$

and the direct predecessors of the successor of the variables are:

$$y_{t-1} \ldots y_{t-k-N+1}.$$

It is known from the theoretical fundamentals that a variable is independent of another variable of this network when the variables within the Markov blanket are known. The required, conditional density is therefore determined from Equation (5) as follows:

$$P(y^u|y^m) \propto P(y_{t-1}|y_{t-2}, \ldots, y_{t-k}, \ldots, y_{t-1-N})^* P(y_{t-2}|y_{t-3}, \ldots, y_{t-k}, \ldots, y_{t-2-N}) \ldots P(y_{t-k}|y_{t-k-1}, \ldots, y_{t-k-N}). \quad (5b)$$

The case of a missing measured value described here can also be expanded to a plurality of missing measured values lying side-by-side without limiting the invention. When this is the case, the one value must first be determined, for example, according to the inventive method on the basis of its neighbors and successors and predecessors and the further value is then determined with this first-determined value. This can continue back and forth until and adequate precision is achieved. The following is valid for this case:

$$y^m \subseteq \{y_{t-1}, y_{t-2}, \ldots, y_{t-n}\} \quad (5c)$$

For all missing values of the time series between the points in time t-1 and t-N, the following is also valid:

$$y^m \subseteq \{y_{t-1}, y_{t-2}, \ldots, y_1\} \quad (5d),$$

which represents the number of all measured values up to point in time t-1. Also valid $$P(y^u|y^m) \propto P(y_{t-1}, \ldots, y_2, y_1) \quad (5e),$$

the right side in (5e) being obtained from Equation (4). In general, these integrals in the preceding equations for the function f cannot be analytically solved in case this is a non-linear function. Details for the numerical solution by means of taking Monte Carlo samples are recited in conjunction with FIG. 3.

Figure 3:
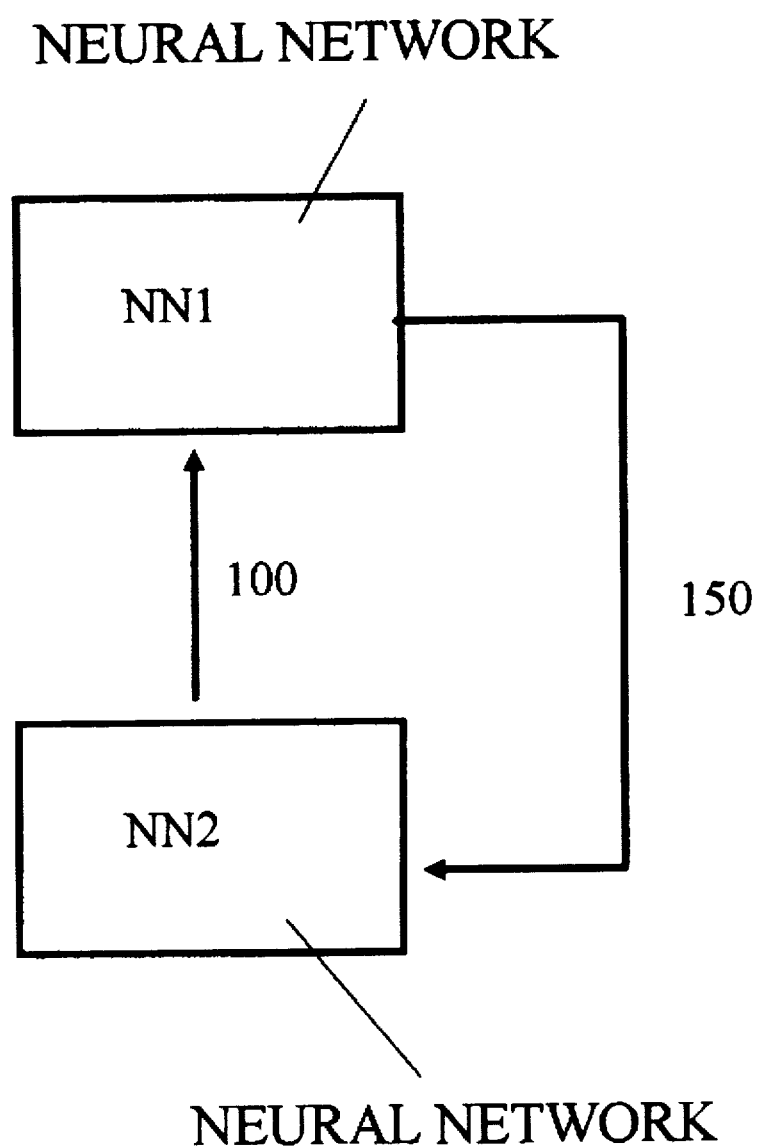
FIG. 3 shows a neural network that is being trained in accordance with the inventive method.

FIG. 3 shows two representations of a neural network NN1 and NN2. First, this can be interpreted such that NN1 is present at one point in time and NN2 is present at another point in time; however, it can also be two completely different neural networks. Two data lines are shown with which the neural networks can communicate; in case of an identity of the two networks, chronologically succeeding exchange events are meant by these lines. NN2 forwards data to NN1 via the data link 100. NN1 forwards data to NN2 via the data link 150. The individual values of the time series, as shown in FIG. 1 and in FIG. 2, are no longer shown here for simplicity. It should be noted, however, that the conditions for FIGS. 1 and 2 are still valid.

For example, the following relationships are valid when training the network with missing data: in case $y_1, \ldots, y_t$ is to represent possible values of the time series, then $y^m \subseteq \{y_1, \ldots, y_t\}$ indicates all measured values and $y^u = \{y_1, \ldots, y_t\} \backslash y^m$ indicate all known values. Let the neural network that models the function f be parameterized, for example, with a set of weightings w. Then the following is valid:

$$f(y_{t-1}, \ldots, y_{t-N}) = NN_w(y_{t-1}, \ldots, y_{t-N})$$

Without limitation of the invention, however, another known parameterizable function approximator can be employed. The logarithmic probability function, also referred to as the log likelihood function, then reads:

$$L = \log \int P^M(y_t, y_{t-1}, \ldots, y_2, y_1) dy^u$$

whereby the common probability density is then approximated as $$P^M(y_t, y_{t-1}, \ldots, y_2, y_1) = P^M(y_N, \ldots, y_1) \prod_{l=N+1}^{t} P^M(y_l | y_{l-1}, \ldots, y_{l-N}) \quad (6)$$

and the following relationship is valid for the neural network for the calculation of the error distribution density:

$$P^M(y_l | y_{l-1}, y_{l-2}, \ldots, y_{l-N}) = P_\epsilon(y_l - NN_w(y_{l-1}, y_{l-2}, \ldots, y_{l-N})) \quad (7)$$

For learning with the assistance of back-propagation or other gradient-based learning algorithms, the gradient of the logarithmized probability function is now also required, this derived as:

$$\frac{\partial L}{\partial w} = \sum_{l=N+1}^{t} \int \frac{\partial \log P^M(y_l | y_{l-1}, \ldots, y_{l-N})}{\partial w} P^M(y^{u(l)} | y^m) dy^{u(l)} \quad (8)$$

It should be noted that one proceeds on the basis of known initial conditions for $y_1, \ldots, y_N$. When a Gaussian distribution for the error distribution is present, it follows therefrom that:

$$\frac{\partial L}{\partial w} \propto \sum_{l=N+1}^{t} \int (y_l - NN_w(y_{l-1}, \ldots, y_{l-N})) \frac{\partial NN_w(y_{l-1}, \ldots, y_{l-N})}{\partial w} P^M(y^{u(l)} | y^m) dy^{u(l)}$$

whereby $y^{u(l)} = y^u \cap \{y_l, \ldots, y_{l-N}\}$ represent the missing values for the inputs of the network and (8a) shows that the integral disappears when all $y_1 \ldots y_{l-N}$ are known.

When the measured values are overlaid with an additional noise, the following relationships derive. Again valid, for example, is:

$$y_t = f(y_{t-1}, y_{t-2}, \ldots, y_{t-N}) + \epsilon_t$$

In this version of the invention, however, there is not to be any direct access to $y_t$. Instead, the time series $$z_t = y_t + \delta_t$$

is to be measured. The contribution $\delta_t$ denotes independent noise with an average value 0. Under the condition that $z = \{z_1, \ldots, z_{t-1}\}$ and $y = \{y_1, \ldots, y_t\}$ are valid, the overall probability density derives as:

$$P(y,z) = P(y_N, \ldots, y_1) \prod_{l=N+1}^{t} P(y_l | y_{l-1}, \ldots, y_{l-N}) \sum_{l=1}^{t} P(z_l | y_l) \quad (8b)$$

The calculating rule for the anticipated, next value of the time series can thus be recited $$E(y_t | z) = \int f(y_{t-1}, \ldots, y_{t-N}) P(y_{t-1}, \ldots, y_{t-N} | z) dy_{t-1} \ldots dy_{t-N} \quad (9)$$

The gradient for the probability function for the training can likewise be calculated. When a Gaussian distribution of the noise with $$z = \{z_1, \ldots, z_t\}$$

is present, it follows that $$\frac{\partial L}{\partial w} \propto \sum_{l=N+1}^{t} \int (y_l - NN_w(y_{l-1}, \ldots, y_{l-N})) \frac{\partial NN_w(y_{l-1}, \ldots, y_{l-N})}{\partial w} \quad (9a)$$

$$P^M(y_1, \ldots, y_{l-N} | z) dy_l \ldots dy_{l-N}$$

In one version of the inventive method, for example, values that are noise-infested or that cannot be exactly determined are supplied to the neural network. Due to the approximation of the weightings in the neural network, new values of the time series can be determined by the function f that is simulated by the neural network. These new values of the time series are subsequently supplied via the data link 150 to the further neural network NN2 which determines new values of the time series therefrom, again by simulation of the function f. This iterative procedure is continued until an adequate precision of the values to be determined has been achieved.

The following fundamentals form the basis for the exact determination of missing values using the Monte Carlo method. It should be noted that all solutions here have the form $$\int h(u, m) P(u | m) du \quad (9b)$$

whereby u denotes the set of unknown variables and m denotes the set of known variables. An integral having this form can, for example, be solved by taking random samples of the unknown variables are taken according to P(u|m). For example, these samples are referenced $u^1, \ldots, u^s$. The following relationship for the approximation follows therefrom:

$$\int h(u,m) P(u|m) du = \frac{1}{S} \sum_{s=1}^{S} h(u^s, m). \quad (9c)$$

It should be noted that u in this equation corresponds to the value $y_{t-k}$, which is missing. With this inventive solution, thus, the problem is reduced to taking samples from P(u|m). When only one variable is missing, the problem is thus reduced to taking samples from a one-variable distribution that can be done with the assistance of the sampling-importance-resampling or with other sampling techniques, Bernardo, J. M., Smith, A. F. M. (1994) Bayesian Theory, Wiley & Sons, pp. 349–355.

The situation becomes somewhat more complicated when more than one measured value is missing. The reason is that the unknown variables are usually dependent on one another and that sampling must be undertaken from the distribution of all unknown variables. A general solution thereof is specified by the Gibbs sampling, as also described in the above textbook. In Gibbs sampling, the unknown variables are initialized with random values or—better—with estimated initial values that, for example, can be derived from the neighboring values of the missing values. Thereafter, one of the unknown variables $u_i$ is selected and a sample of $P(u_i|m, u\backslash u_i)$ is taken; $u_i$ is then set to this value. The procedure then is repeated for the next unknown variable, etc. Apart from, for example, the first samples, the samples are preferably taken with the corrected error distribution density. This, however, means that samples must be taken for all unknowns that ever occurred in the time series. In practice, however, the time window can be drawn, for example, from the samples and can be limited to a reasonable size. For example, this size can correspond to the size of the Markov blanket for the missing values. It should thereby be noted that the coupling of the unknowns fails in that case wherein successive values are known between two missing values N and that further values of this time series therefore need not be considered.

Taking samples for future values is especially simple according to the inventive method, however, it must be noted that it does not function like this for deterministic systems. The inventive procedure presents an especially simple solution for these situations that seem especially complicated. For the prediction of the values of the time series, the values obtained according to the corresponding distribution are substituted and the prognoses thereof are averaged, this yielding the missing value according to the inventive method. When training the network, for example, the average of the error gradients is formed by employing the values of the time series, that were determined with the samples, for the calculation thereof. For example, one can proceed as follows when taking the samples according to the Monte Carlo method.

For example, K steps in the future of the time series are to be predicted. In conjunction with the equations discussed above, this means that the values $y_{t-1}, \ldots, y_{t-K+1}$ are missing and that $y_t$ is to be predicted under these conditions. The Monte Carlo method is extremely simple under these conditions. First, for example, a sample must be taken from the distribution $P(y_{t-K+1}|y_{t-K}, \ldots, y_{t-K-N})$. This sample is referenced $y^s_{t-K+1}$. A further sample $y_{t-K+2}$ is taken from the distribution $P(y_{t-K+2}|y^s_{t-K+1}, \ldots, y_{t-K+1-N})$ with this sample and the preceding measurements, etc., until each sample was generated for each unknown. When this procedure is repeated S times, then one obtains $$E(y_t,M_{t-1}) = \frac{1}{S} \sum_{s=1}^{S} f(y^s_{t-2}, y^2_{t-N}) \quad (9d)$$

The experimental findings have shown that the inventive method works far better than numerical solutions that were previously employed, even given few samples.

Although modifications and changes may be suggested by those skilled in the art, it is the intention of the inventors to embody within the patent warranted hereon all changes and modifications as reasonably and properly come within the scope of their contribution to the art.

I claim as my invention:

1. A method for training a computerized neural network, comprising the steps of:

a) in a computer, forming a time series of a set of measured values of a variable dynamic input quantity by determining respective values of the input quantity at discrete points in time;

b) in said computer, identifying a statistical noise distribution of an uncorrelated noise of finite variance that has a chronological average of zero and is superimposed on the measured values;

c) in said computer, generating a substitute value for any missing measured values in the time series by, for each missing value, calculating a statistical missing value noise distribution according to said known noise distribution from at least one of said measured values neighboring the missing value in the time series and calculating said substitute value from a plurality of Monte Carlo samples of the missing value obtained according to the missing value noise distribution and replacing said missing value with said substitute value;

d) supplying said time series, with the substitute value generated in step (c) replacing any missing value, from said computer to a computerized neural network as input quantities; and e) training said neural network using said time series and a behavior of a technical system represented by the neural network.

2. A method according to claim 1, wherein step (c) comprises obtaining said plurality of Monte Carlo samples of the missing value according to the missing value noise distribution and determining values thereof by calculating an arithmetic average of all of said samples.

3. A method according to claim 1, wherein a value for a first of two missing and immediately neighboring measured values of the time series is generated first and a value for a second of said two missing and immediately neighboring measured values is generated thereafter using the value generated first.

4. A method according to claim 1 comprising repeating steps (a) through (b) multiple times.

5. A method according to claim 1, wherein the step of training said neural network includes, this, in a back-propagation learning step, determining a learning step width for the input quantities of the neural network normed to one by dividing the plurality of Monte Carlo samples by 0.1.

6. A method according to claim 1, where in step (b) comprises using a Gaussian distribution as said statistical noise distribution.

7. A method according to claim 1 wherein step (a) comprises forming said a time series with form:

$$y_t = f(y_{t-1}, y_{t-2}, \ldots, y_{t-N}) + \epsilon_t$$

wherein $\epsilon_t$ is said statistical noise distribution, y are measured values of the time series, $y_t$ is said missing value for which said value is to be generated by the neural network, the function f is internally available to the neural network, and wherein the statistical error distribution density is determined in step (b) as $$P_e(y_{t-1} - f(y_{t-1}, y_{t-2}, \ldots, y_{t-N})) = P(y_t | y_{t-1}, y_{t-2}, \ldots, y_{t-N})$$

from which Monte Carlo samples $y_{t-k}^1 \ldots y_{t-k}^s$ are taken and said value of the missing value to be generated by the neural network with said samples is calculated:

$$E(y_{t-k}, m) = \frac{1}{S} \sum_{s=1}^{S} f(y^s_{t-k}, m)$$

wherein $y_{t-k}$ are the missing measured value in the time series, $k \leq N$, m represents all known measured values of the time series, and S is the number of samples.

8. A method according to claim 7, wherein said function f is modeled by the neural network.

9. A method according to claim 7, wherein the function f is stored in a memory accessible by the neural network.

10. A method according to claim 7 comprising the additional step of training said neural network using said time series and a behavior of a technical system represented by the neural network, including training the neural network with at least one generated value according to a learning function:

$$w_{new} = w_{alt} + \eta \frac{\partial L}{\partial w}$$

wherein w represents neuron weighting, L is a logarithmic probability function, $\eta$ is a learning factor, and wherein $$\frac{\partial L}{\partial w} = \frac{1}{S} \sum_{s=1}^{S} \sum_{l=N+1}^{t} \frac{\partial \log P^M(y_{l-1}^s, \ldots, y_{l-N}^s)}{\partial w}$$

with $NN_w$ values of the function from the neural network, and employing measured values of the time series for $y_l^s$ and, when a value is not present, $$P^M(y^l|y^m)$$

Monte Carlo samples are obtained from the probability distribution density.

11. A method according to claim 7 comprising the additional step of training said neural network using said time series and a behavior of a technical system represented by the neural network, including training the neural network with at least one generated value according to a learning function:

$$w_{new} = w_{alt} + \eta \frac{\partial L}{\partial w}$$

wherein w represents neuron weighting, L is a logarithmic probability function, $\eta$ is a learning factor, and wherein $$\frac{\partial L}{\partial w} = \frac{1}{S} \sum_{s=1}^{S} \sum_{l=N+1}^{t} y_l^s -$$

$$NN_w(y_{l-1}^s, \ldots, y_{l-N}^s)) \frac{\partial NN_w(y_{l-1}^s, \ldots, y_{l-N}^s)}{\partial w}$$

wherein $NN_w$ are values of the function from the neural network, $y_l^s$ are measured values of the time series and wherein $$P^M(y^l|y^m)$$

Monte Carlo samples are obtained from the probability distribution density, with m representing all known measured values of the time series.

12. A method according to claims 11 comprising training the neural network with a learning rule:

$$w_{new} = w_{alt} + \eta \frac{\partial L}{\partial w}$$

wherein w represents neuron weighting, L is a logarithmic probability function, $\eta$ is a learning factor, and wherein $$\frac{\partial L}{\partial w} \propto \sum_{l=N+1}^{t} \int (y_l -$$

$$NN_w(y_{l-1}, \ldots, y_{l-N})) \frac{\partial NN_w(y_{l-1}, \ldots, y_{l-N})}{\partial w} \times$$

$$P^M(y_l, \ldots, y_{l-N}|z) dy_l \ldots dy_{l-N}.$$

13. A method according to claim 1, wherein the statistical noise distribution of the measured values is unknown and the measured values are superimposed with further noise having a statistical noise distribution which is known, wherein step (a) comprises forming said time series with a form:

$$z_t = y_t + \delta_t = f(y_{t-1}, y_{t-2}, \ldots, y_{t-N}) + \epsilon_t$$

wherein $\epsilon_t$ is the unknown statistical noise distribution, $\delta_t$ is the known statistical noise distribution, y: are the measured values of the time series, $y_t$ is the value to be generated by the neural network, and wherein the statistical error distribution density is determined as:

$$P_\epsilon(y_{t-1} - f(y_{t-1}, y_{t-2}, \ldots, y_{t-N})) = P(y_t|y_{t-1}, y_{t-2}, \ldots, y_{t-N})$$

and the overall probability density over the time series is determined with:

$$P(y,z) = P(y_1, \ldots, y_N) \prod_{l=N+1}^{t} P(y_l|y_{l-1}, \ldots, y_{l-N}) \prod_{l=1}^{t} P(z_l|y_l)$$

and wherein step (c) comprises generating said value for said missing value by the neural network derived from at least one edited value as and obtaining Monte Carlo samples for $$P(y_{t-1}, \ldots, y_{t-N}|z).$$

* * * * *